(12) United States Patent
Sylvain (10) Patent No.: US 9,401,934 B2
(45) Date of Patent: Jul. 26, 2016

(54) ESTABLISHING SESSIONS WITH DEFINED QUALITY OF SERVICE

(75) Inventor: Dany Sylvain, Gatineau (CA)

(73) Assignee: Microsoft Technology Licensing, LLC, Redmond, WA (US)

( * ) Notice: Subject to any disclaimer, the term of this patent is extended or adjusted under 35 U.S.C. 154(b) by 3391 days.

(21) Appl. No.: 11/159,033

(22) Filed: Jun. 22, 2005

(65) Prior Publication Data
US 2007/0002832 A1 Jan. 4, 2007

(51) Int. Cl.
| | |
|---|---|
| H04L 29/06 | (2006.01) |
| H04L 29/08 | (2006.01) |
| H04W 76/02 | (2009.01) |
| H04W 28/18 | (2009.01) |
| H04W 80/10 | (2009.01) |

(52) U.S. Cl.
CPC ........ *H04L 65/1016* (2013.01); *H04L 63/0892* (2013.01); *H04L 63/10* (2013.01); *H04L 65/103* (2013.01); *H04L 65/1006* (2013.01); *H04L 65/80* (2013.01); *H04L 67/14* (2013.01); *H04L 67/148* (2013.01); *H04W 76/022* (2013.01); *H04W 28/18* (2013.01); *H04W 80/10* (2013.01)

(58) Field of Classification Search
CPC ............ H04L 63/0892; H04L 65/1016; H04L 65/1006; H04L 67/14; H04L 63/10; H04L 65/80; H04L 65/103; H04L 67/148
USPC ................... 709/219; 370/341, 349, 352, 466
See application file for complete search history.

(56) References Cited

U.S. PATENT DOCUMENTS

| | | | |
|---|---|---|---|
| 6,788,676 B2 | 9/2004 | Partanen et al. | |
| 6,810,035 B1* | 10/2004 | Knuutila | H04W 4/12 370/354 |
| 2002/0055990 A1 | 5/2002 | Vaman et al. | |
| 2004/0131078 A1* | 7/2004 | Gupta et al. | 370/466 |

(Continued)

FOREIGN PATENT DOCUMENTS

| | | | | |
|---|---|---|---|---|
| GB | WO9929135 A1 * | 6/1999 | | H04L 29/06 |
| GB | 2398204 | 8/2004 | | |

(Continued)

OTHER PUBLICATIONS

International Search Report for PCT/IB2006/001689 mailed Jan. 3, 2007.

(Continued)

*Primary Examiner* — Sonia Gay
(74) *Attorney, Agent, or Firm* — Judy Yee; Micky Minhas (57) ABSTRACT

The present invention allows different types of communication applications to cooperate with an associated communication client to facilitate communications having a defined quality of service. The communication client may establish an authorized virtual circuit having a defined quality of service through a network using a first session establishment protocol on behalf of the communication application. Once the authorized virtual circuit is established, the communication application may establish one or more communication sessions, which may support different types of multimedia services, through the virtual connection. In one embodiment, the virtual connection extends through the local access network, which may be supported by an IP multimedia subsystem (IMS). The communication client may use the Session Initiation Protocol (SIP) as the first session establishment protocol to establish the virtual circuit through the local access network.

20 Claims, 10 Drawing Sheets

(56) References Cited

U.S. PATENT DOCUMENTS

| | | | |
|---|---|---|---|
| 2004/0184432 A1* | 9/2004 | Gateva et al. | 370/349 |
| 2005/0132412 A1* | 6/2005 | Richardson et al. | 725/100 |
| 2006/0047837 A1* | 3/2006 | Rissanen | H04W 88/02 709/230 |
| 2006/0080407 A1* | 4/2006 | Rengaraju | 709/219 |
| 2006/0251043 A1* | 11/2006 | Madour et al. | 370/349 |
| 2006/0291447 A1* | 12/2006 | Siliquini et al. | 370/352 |

FOREIGN PATENT DOCUMENTS

| | | |
|---|---|---|
| WO | WO-2004004407 | 1/2004 |
| WO | WO-2005018200 | 2/2005 |
| WO | WO-2006136926 | 12/2006 |

OTHER PUBLICATIONS

"3rd Generation Partnership Project; Technical Specification Group Services and System Aspects; 3GPP enablers for Open Mobile Alliance (OMA); Push-to-talk over Cellular (PoC) services; Stage 2 (Release 6)", 3rd Generation Partnership Project, Jun. 1, 2005, pp. 1-38.

"Digital cellular telecommunications system (Phase 2+) (GSM); Universal Mobile Telecommunications System (UMTS); General Packet Radio Service (GPRS) Service description; Stage 2 (3GPP TS 23.060 version 5.1.0 Release 5)", European Telecommunications Standards Institute, Mar. 1, 2002, 206 pages.

"Digital cellular telecommunications system (Phase 2+) (GSM); Universal Mobile Telecommunications System (UMTS); Mobile Station (MS) supporting Packet Switched Services (3GPP TS 27.060 version 4.0.0 Release 4)", European Telecommunications Standards Institute, Mar. 1, 2001, 30 pages.

"Digital cellular telecommunications system (Phase 2+)", Universal Mobile Telecommunications System (UMTS); End to end Quality of Service (QoS) signaling flows (3GPP TS 29.208 version 6.3.0 Release 6), Mar. 1, 2005, 55 pages.

"Digital cellular telecommunications system (Phase 2+)", Universal Mobile Telecommunications System (UMTS); End-to-end Quality of Service (QoS) concept and architecture (3GPP TS 23.207 version 6.4.0 Release 6), Sep. 2004, 55 pages.

"Extended European Search Report", EP Application No. 06779746.4, Feb. 17, 2011, 9 Pages.

"Foreign Office Action", EP Application No. 06779746.4, Apr. 8, 2014, 7 Pages.

"Foreign Office Action", EP Application No. 06779746.4, May 13, 2013, 6 pages.

"Summons to Attend Oral Proceedings", EP Application No. 06779746.4, Feb. 4, 2015, 7 pages.

Zhuang,"Policy-Based QoS Architecture in IP Multimedia Subsystem of UMTS", http://kjloh.tripod.com/pubs/policy_in_UMTS_IEEE_Network.pdf, May 1, 2003, 17 Pages.

* cited by examiner

ESTABLISHING SESSIONS WITH DEFINED QUALITY OF SERVICE

FIELD OF THE INVENTION

The present invention relates to communications, and in particular to establishing authorized sessions having defined quality of service in mobile communication environments.

BACKGROUND OF THE INVENTION

The evolution of and interworking between mobile communication networks and the Internet have led to efforts to converge multimedia services, such as data, speech, audio, video, and other media services, over an Internet Protocol (IP) based infrastructure. As such, the mobile communications industry is in a transition phase from supporting only voice and short messaging services to supporting numerous multimedia services for different types of applications. The traditional voice and short messaging services are being complemented by person-to-person and group applications. These applications allow audio and video streaming, file sharing, multiplayer gaming experiences, and push-to-talk services, just to name a few of the many services to be supported. These services may be combined in a dynamic fashion to further enhance the subscriber's experience.

All of these services require significant amounts of bandwidth, and more importantly, control of allocated bandwidth and the overall control of quality of service (QoS) with respect to communication sessions. The Third Generation Partnership Project (3GPP) is employing the IP Multimedia Subsystem (IMS) to help bridge the gap between the traditional mobile communication and Internet networks to support these services and provide controlled access and management. In particular, an IMS architecture uses the Session Initiation Protocol (SIP) for multimedia session negotiation and management for controlling IP-based communication services. Multiple sessions may be established at any given time for a user, and associated as desired. Once sessions are authorized and established, the IMS architecture should provide a designated quality of service, depending on the type of session established, the user's subscription requirements, or other policies controlling the resources a subscriber should be afforded. The quality of service mechanisms ensure that subscribers are provided with the resources to which they are entitled, while preventing subscribers from using more resources than needed or deserved. Unfortunately, the current IMS architecture only supports SIP-based applications. Non-SIP applications are not supported.

Accordingly, there is a need for a mobile communications architecture that will support various types of non-SIP applications, as well as provide reliable QoS for these applications. There is a further need to provide such an architecture within an IMS framework.

SUMMARY OF THE INVENTION

The present invention allows different types of communication applications to cooperate with an associated communication client to facilitate communications having a defined quality of service. In particular, the communication client may establish a virtual circuit having a defined quality of service through a network using a first session establishment protocol on behalf of the communication application. Once the virtual circuit is established, the communication application may establish one or more communication sessions, which may support different types of multimedia services, through the virtual circuit. In one embodiment, the virtual connection extends through the local access network, which may be supported by an IP multimedia subsystem (IMS). The communication client may use the Session Initiation Protocol (SIP) as the first session establishment protocol to establish the virtual circuit through the local access network. The local application can then use any type of session establishment protocol, SIP or otherwise, to establish the communication sessions through the virtual circuit to the appropriate endpoint, which may be another mobile terminal or application server.

In general, the communication application and the communication client may cooperate with one another to obtain communication capabilities for the other endpoint as well as for the network through which the virtual circuit is established, and use this information to determine whether or not communications are appropriate. The communication client may provide virtual circuit information, which is information sufficient to allow the communication sessions to be established through the virtual circuit, directly or indirectly through the communication client. The multimedia sessions supported through the virtual circuit may represent different types of media, including audio, video, data, and voice. Different types of sessions may be established at any given time to facilitate an enhanced multimedia service with a defined quality of service level.

Those skilled in the art will appreciate the scope of the present invention and realize additional aspects thereof after reading the following detailed description of the preferred embodiments in association with the accompanying drawing figures.

BRIEF DESCRIPTION OF THE DRAWING FIGURES

The accompanying drawing figures incorporated in and forming a part of this specification illustrate several aspects of the invention, and together with the description serve to explain the principles of the invention.

DETAILED DESCRIPTION OF THE PREFERRED EMBODIMENTS

The embodiments set forth below represent the necessary information to enable those skilled in the art to practice the invention and illustrate the best mode of practicing the invention. Upon reading the following description in light of the accompanying drawing figures, those skilled in the art will understand the concepts of the invention and will recognize applications of these concepts not particularly addressed herein. It should be understood that these concepts and applications fall within the scope of the disclosure and the accompanying claims.

The present invention allows multimedia services to be provided over disparate types of networks while providing an appropriate quality of service (QoS). The multimedia sessions may be established between fixed or mobile devices, or between application servers that may provide content for a given multimedia session. Although the invention is applicable to various types of mobile communication environments, the embodiments described in detail relate to improving an IP multimedia subsystem (IMS) architecture within a 3GPP network. Those skilled in the art will recognize applications of the concepts embodied in the present invention in Code Division Multiple Access (CDMA), Global System for Mobile Communications (GSM), Enhanced Data Rates for GSM Evolution (EDGE), Universal Mobile Telecommunications System (UTMS), and other mobile communication systems such as Wireless LAN WLAN (IEEE 802.11, 802.16) and broadband access (DSL, cable, fiber). The concepts of the present invention may also be applied to fixed or wired terminals. Prior to delving into the details of the present invention, an overview of a communication environment that is capable of supporting IMS is provided in association with FIG. 1.

Figure 1:
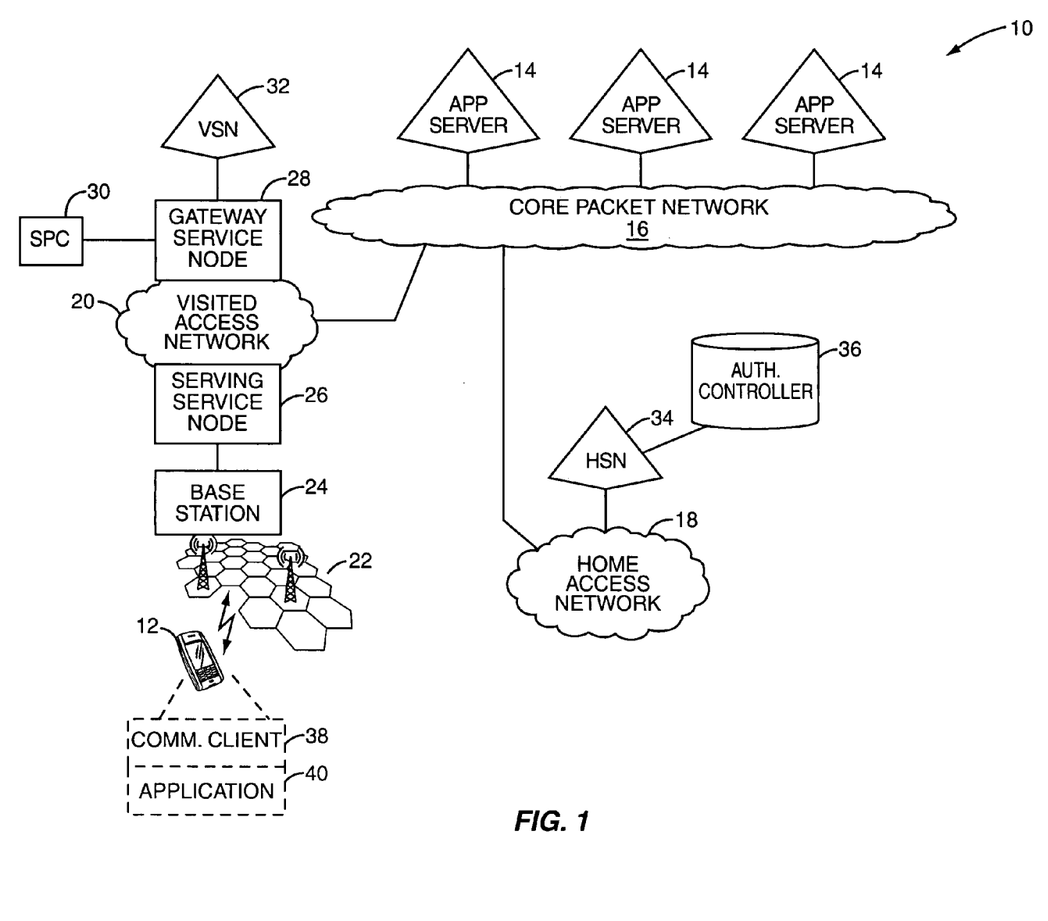
FIG. 1 is a block representation of a communication environment according to one embodiment of the present invention.

The communication environment 10 illustrated in FIG. 1 allows a mobile terminal 12, such as a mobile telephone, personal digital assistant (PDA), or personal computer, to communicate with any number of endpoints, such as another mobile terminal 12 or an application server 14 via a core packet network 16. Depending on the location of the mobile terminal 12, access to the core packet network 16 may be provided directly or indirectly via a home access network 18 or visited access network 20. The home access network 18 is generally the access network associated with the primary location of the mobile terminal 12, and is the access network through which elements on visited access networks 20 will obtain subscriber and other related service information for the mobile terminal 12, as the mobile terminal 12 roams away from the home access network 18. The mobile terminal 12 may use various types of cellular or local wireless communication techniques to access the home access network 18 or the visited access network 20.

As illustrated, a wireless or cellular access network 22, which is associated with one or more base stations 24, is used to gain access to the visited access network 20. The base station 24 will connect to the visited access network 20 via a serving service node 26, which may be referred to as a 3GPP Serving GPRS (General Packet Radio Service) Support Node (SGSN) in an IMS architecture. Accordingly, the serving service node 26 is the actual access point to the visited access network 20. The visited access network 20 may connect directly or indirectly to the core packet network 16 via a gateway service node 28, which may be referred to as a Gateway GPRS Support Node (GGSN) in an IMS architecture. The gateway service node 28 may directly or indirectly through other networks provide access to service policy controllers (SPCs) 30 as well as visited service nodes 32, which may be referred to as call session control functions (CSCF) in a 3GPP IMS architecture. When the CSCF is associated with a visited access network 20 for the mobile terminal 12, the CSCF will act as a proxy for the mobile terminal 12.

In a similar fashion, the home access network 18 is associated with a home service node 34, which may take the form of a serving-CSCF in a 3GPP IMS architecture. The serving-CSCF performs session control services for the subscriber, and provides call intelligence and processing logic. Accordingly, the VSN 32 and the HSN 34 may act as proxies, and will cooperate to aid in the setup and management of sessions and the forwarding of messages between IMS networks to facilitate the various multimedia sessions with the mobile terminal 12. An authentication controller 36 may take the form of a home subscriber service (HSS) in a 3GPP IMS network. The authentication controller 36 generally contains most of the key subscriber data associated with the mobile terminal 12 and enables the various mobile terminals 12 and other entities, including the application servers 14, to find and communicate with other entities. Accordingly, authentication of subscribers and their relative service requests must be authenticated or authorized via the authentication controller 36. Those skilled in the art will recognize the basic operation of the VSN 32, HSN 34, and the authentication controller 36 in light of current 3GPP and IMS practices.

Notably, the mobile terminal 12 will generally include a communication client 38 to facilitate multimedia sessions within the IMS architecture using the Session Initiation Protocol (SIP). Applications 40 running on the mobile terminal 12 will need to cooperate with the communication client 38 to facilitate communications. With the present invention, any type of application 40, even those that are not SIP-based, will be able to engage in multimedia sessions through the communication client 38, and those sessions will be supported by a defined quality of service.

Figure 2A:
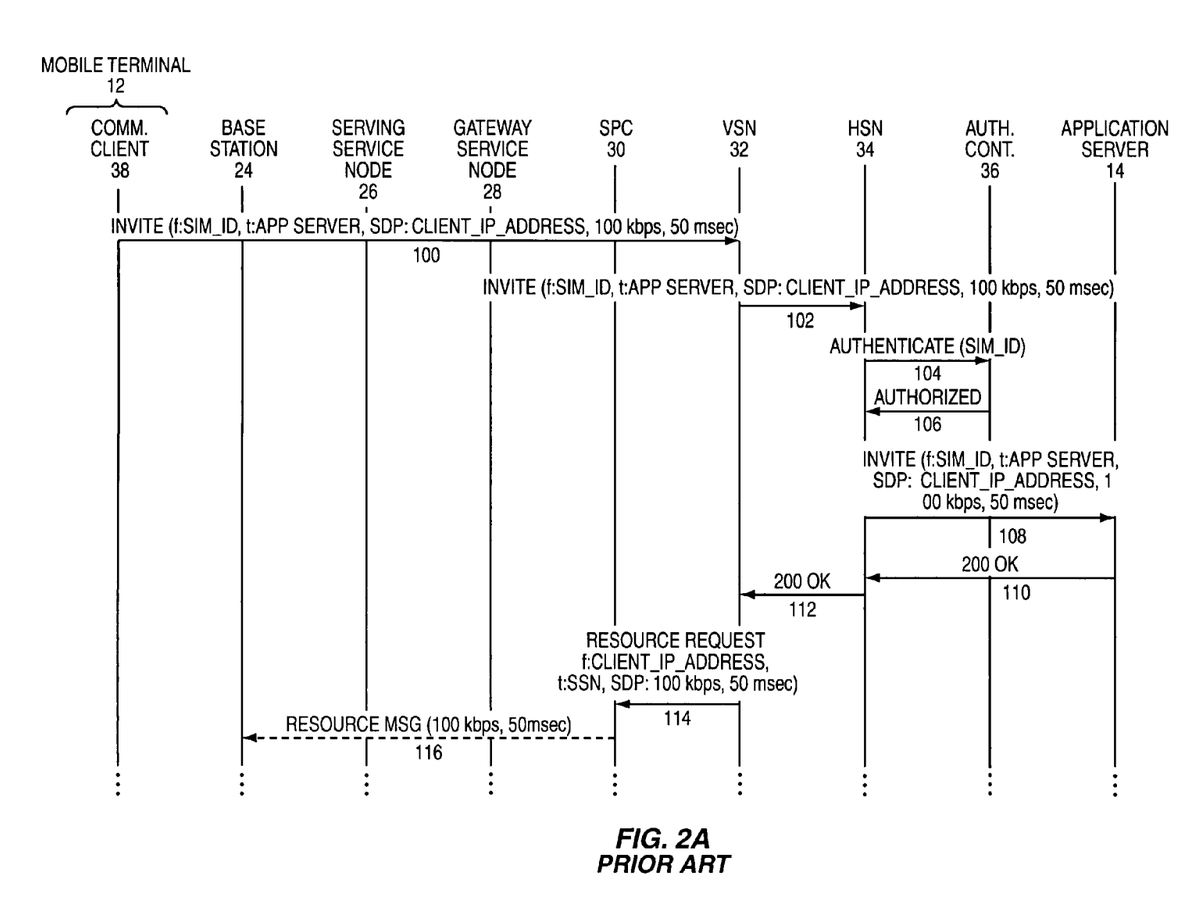
FIGS. 2A and 2B show a communication flow diagram illustrating classic IMS operation.
Figure 2B:
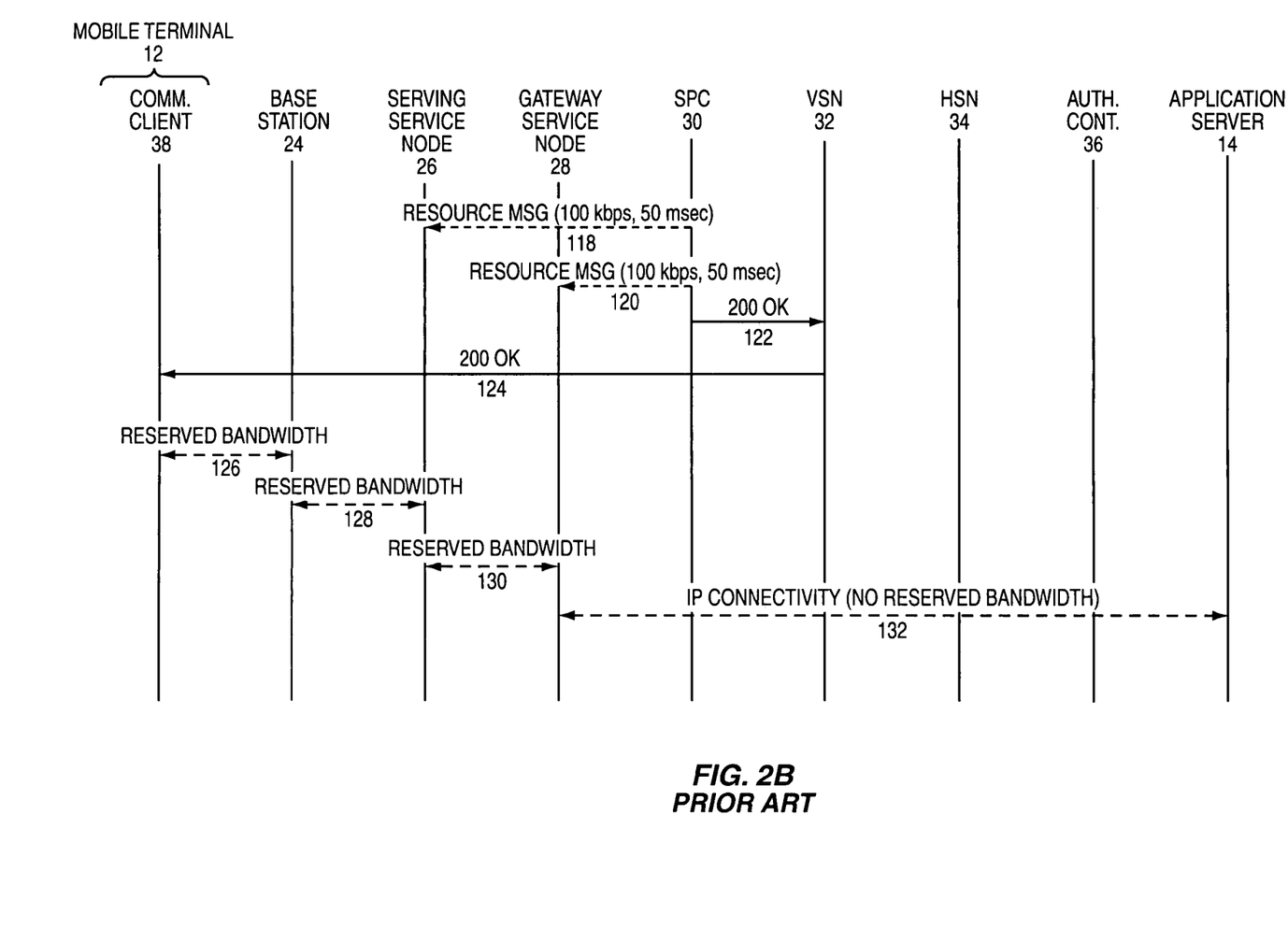

In an effort to contrast the present invention with typical IMS operation, a communication flow illustrating establishment of a traditional IMS multimedia session is provided prior to providing communication flows for creating such sessions using the techniques of the present invention. With reference to FIGS. 2A and 2B, a simplified communication flow is illustrated according to classic IMS operation. Initially, the communication client 38 residing in the mobile terminal 12 will attempt to initiate a communication session with another endpoint, such as the application server 14. As such, the communication client 38 will send an Invite message to the VSN 32 (step 100). The Invite message may indicate that the Invite is from the mobile terminal 12 having a certain identification, such as a subscriber identification module (SIM) identifier (ID), and is intended for the particular application server 14. The Invite message may also include Session Description Protocol (SDP) information, which may include address and port information for communications with the communication client 38 as well as any other communication clients, such as the bandwidth (100 kbps) and maximum latency (50 msec) required for the session. The VSN 32 will forward the Invite message to the HSN 34 (step 102), which will interact with the authentication controller 36 to authenticate the subscriber and the requested session. As such, the HSN 34 may send an Authenticate request including the authentication information for the mobile terminal 12 to the authentication controller 36 (step 104).

Based on the identification information, the authentication controller 36 may look up the subscriber's service profile, and either provide the profile to the HSN 34 or provide authorization based on the profile (step 106). The service profile information allows either the authentication controller 36 or the HSN 34 to identify services that need to be executed, determine the order in which multiple services are executed, determine the addresses of application servers 14 or other endpoints that should execute the requested services, and inform the application servers 14 of the order in which services should be executed in the case that multiple services need to be executed on the same application server 14. Assuming the session request is authorized, the HSN 34 will forward the Invite message to the appropriate application server 14 (step 108), which will begin processing the request and send a 200 OK message back to the HSN 34 in traditional fashion (step 110).

The HSN 34 will forward the 200 OK message to the VSN 32 (step 112), which will take the necessary steps to reserve or otherwise allocate resources for the communication session with the base station 24 facilitating communications with the mobile terminal 12, the serving service node 26, and the gateway service node 28. To facilitate this, a Resource Request is sent to the session policy controller 30 (step 114). The Resource Request may identify the information required to communicate with the communication client 38 (CLIENT_IP_ADDRESS) as well as the identity of the serving service node 26 and the session description protocol (SDP) information pertaining to the actual resources required for the service. These resources dictate the resultant quality of service. The SPC 30 will then send a Resource message, perhaps using a Common Open Policy Service (COPS) message, to the base station 24, serving service node 26, and gateway service node 28 (steps 116, 118, and 120) to reserve these resources for the particular communication session. The SPC 30 will then send a 200 OK message to the VSN 32 in response to the Resource Request (step 122). At this point, the VSN 32 will send a 200 OK message to the communication client 38 in response to the original Invite message (step 124).

Bandwidth has now been reserved in at least three different sections of the communication path between the communication client 38 and the application server 14. Bandwidth has been reserved between the communication client 38 or the mobile terminal 12 and the base station 24 (step 126); between the base station 24 and the serving service node 26 (step 128); and between the serving service node 26 and the gateway service node 28 (step 130). A general IP connection is provided between the gateway service node 28 and the application server 14 via the core packet network 16 (step 132). In typical IMS operation, only SIP-based applications are able to use this IMS architecture, because the communication clients 38 that are capable of working with an IMS architecture generally only support SIP communications, and have limited ability to interact with applications 40. These applications 40 are limited to SIP-based applications.

The present invention allows non-SIP applications 40 to cooperate with the communication client 38 to establish communication sessions that are authorized and provided a defined QoS. The present invention uses elements associated with the visited (or home) access network 20 to establish authorized virtual connections, such as tunnels, between the mobile terminal 12 and the gateway service node 28 through the visited (or home) access network 20. The authorized virtual connections will be afforded sufficient QoS parameters to support the desired multimedia service or services over the visited (or home) access network 20. The local applications 40, SIP-based or otherwise, will establish communication sessions through the virtual connections to take advantage of the QoS afforded to the virtual connections. In an IMS architecture, the IMS components are used to establish the virtual connections through the local access network or beyond. These virtual connections may be established using SIP messaging, as will be described below.

Figure 3A:
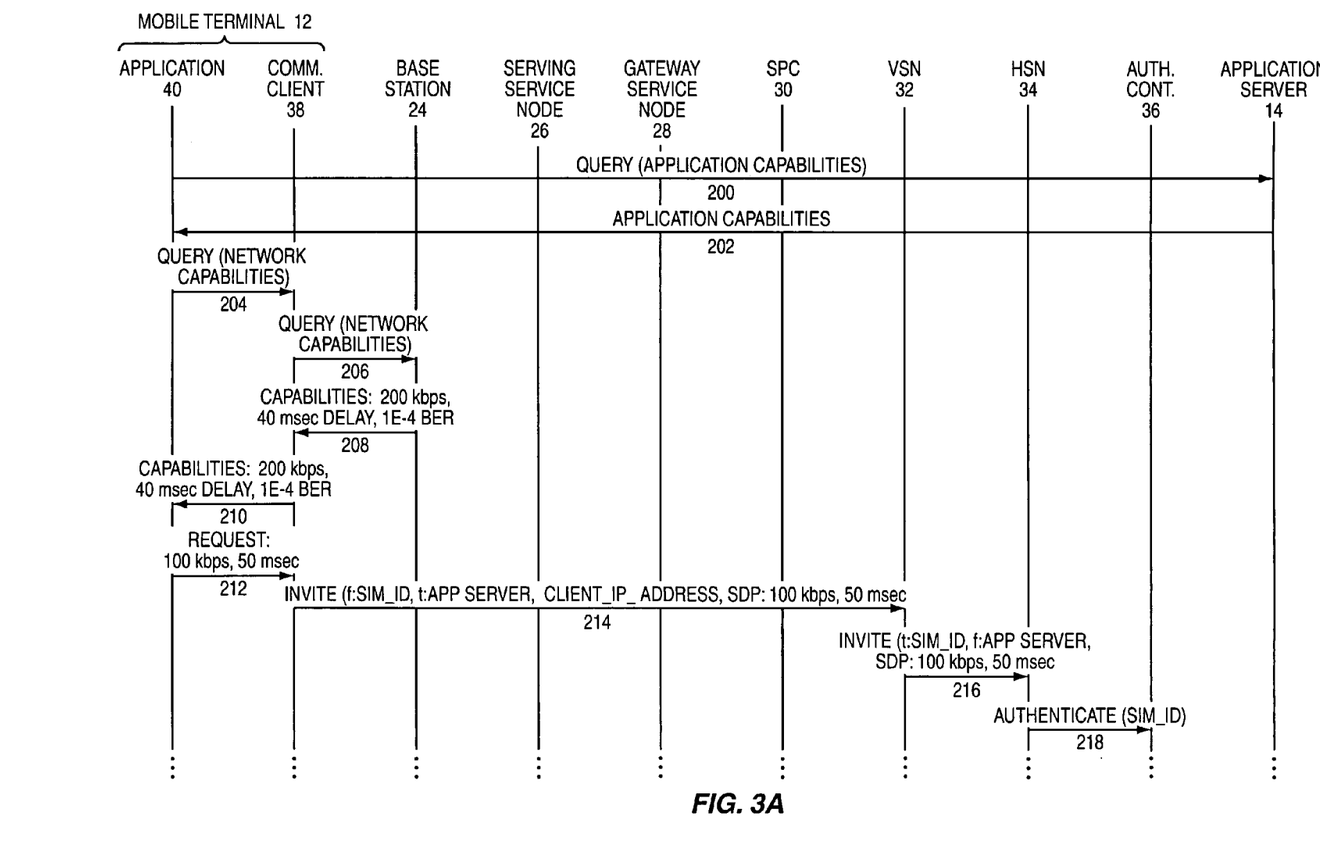
FIGS. 3A and 3B show a communication flow diagram illustrating operation of the present invention according to one embodiment.
Figure 3B:
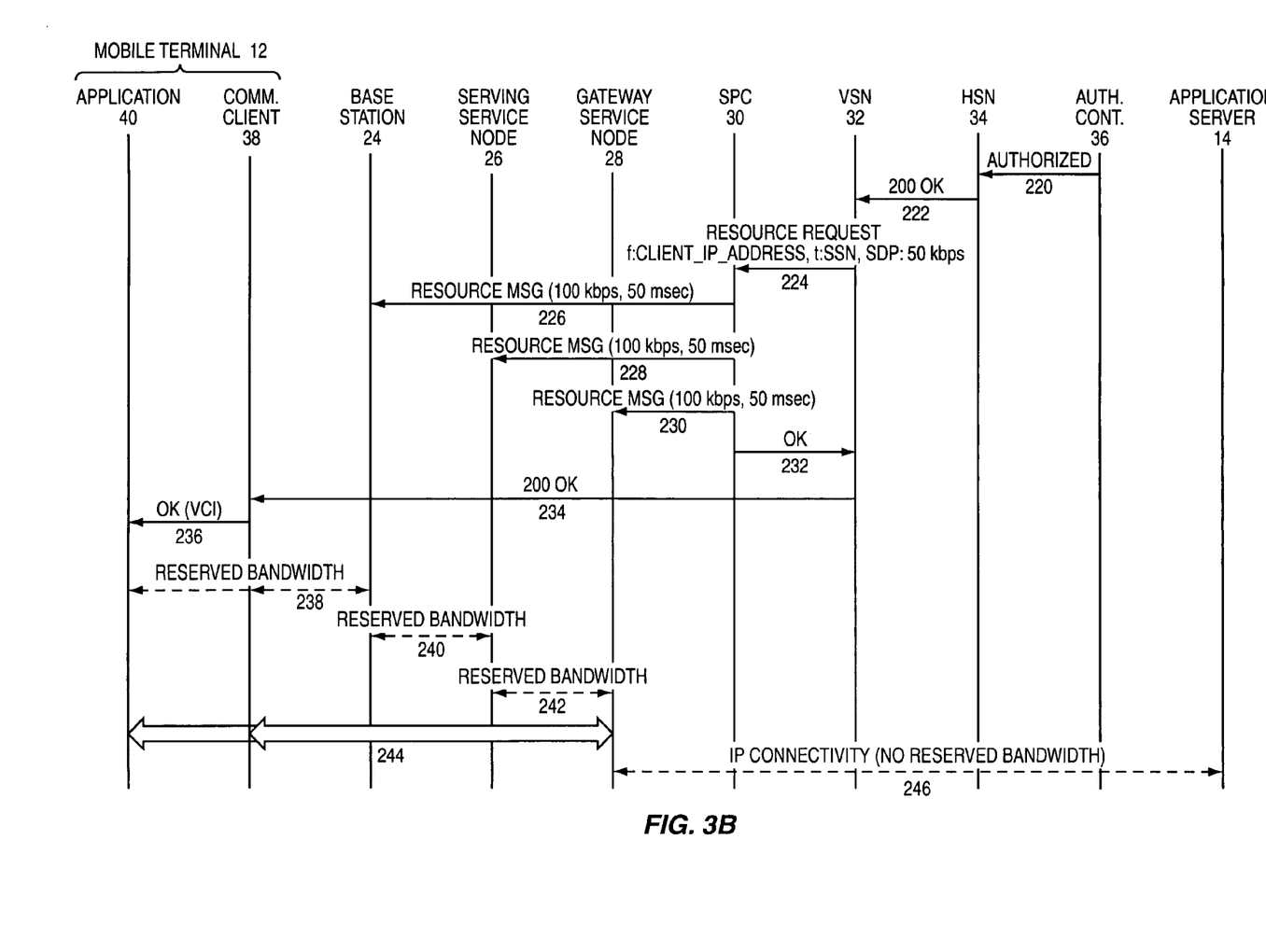

A first embodiment is illustrated in association with the communication flow of FIGS. 3A and 3B. In this embodiment, the local application 40, which is not SIP-based, will negotiate with the communication client 38 to have the communication client 38 establish a virtual connection to the gateway service node 28. The virtual connection will be afforded sufficient QoS parameters to support the desired multimedia service or services. The QoS parameters may include bandwidth, jitter, latency, or other pertinent QoS indicia. Prior to initiating a request for a virtual connection, the local application 40 may send a query to the appropriate application server 14 (or other endpoints with which services are requested) to obtain the capabilities of the application supported by the application server 14 (step 200). The application server 14 will respond with the application capabilities (step 202). The local application 40 will then send a query to the communication client 38 to obtain the capabilities of the appropriate access network, which is the visited access network 20 in this example (step 204). The communication client 38 will then query the base station 24 (or other appropriate access point) for appropriate communication capabilities (step 206). The base station 24 will obtain the information bearing on the appropriate capabilities, and provide such information back to the communication client 38 (step 208). The capabilities information is then forwarded to the local application 40 (step 210).

In this case, assume the communication capabilities associated with the visited access network 20 indicate that there is sufficient bandwidth to support a 200 kbps data rate, with a maximum of 40 msec delay and a 1E-4 bit error rate (BER). Based on the requirements of the local application 40 and the capabilities of the application server 14 and the visited access network 20, the local application 40 will determine if the various capabilities are sufficient to support the requirements of the multimedia session. In this case, assume the multimedia session requires a bandwidth of 100 kbps and a maximum delay of 50 msec. In this case, the capabilities of the visited access network 20 are sufficient to meet those required by the local application 40. As such, the local application 40 will send a connection request to the communication client 38 to cause the communication client 38 to establish an authorized virtual connection with the gateway service node 28 (step 212).

In order to establish the connection with the gateway service node 28, the communication client 38 will send an Invite message to the VSN 32 (step 214). The Invite message will include the identification (SIM ID) of the mobile terminal 12 from which the Invite message originated, and indicate that the Invite is intended to establish a session with the application server 14. The Invite message may further identify the IP address of the communication client 38 as well as session description protocol information identifying the communication requirements for the multimedia session. The VSN 32 will forward the Invite message to the HSN 34 (step 216), which will interact with the authentication controller 36 to obtain authorization or determine whether the request is authorized (steps 218 and 220). The HSN 34 will then forward a 200 OK message to the VSN 32 in response to the Invite message of step 216 (step 222). The VSN 32 will then send a Resource Request message to the SPC 30 to reserve sufficient resources for the virtual connection (step 224). The Resource Request message will identify the mobile terminal 12 using the client IP address, identify the entry point to the visited access network 20, and provide the requisite session description protocol parameters. The Resource Request message may be a COPS request.

In response, the SPC 30 will send a Resource message, which may be a COPS message, to each of the base station 24, serving service node 26, and gateway service node 28 to reserve sufficient resources for the virtual connection between each of these three entities (steps 226, 228, and 230). The SPC 30 will then send an OK message back to the VSN 32 (step 232), which will forward a 200 OK message in response to the Invite message of step 214 to the communication client 38 (step 234). The communication client 38 will then provide the requisite virtual connection information, which may be binding reference information identifying address, port, and other information necessary for communicating over the virtual connection to the gateway service node 28 in an OK message sent to the local application 40 in response to the connection request of step 212 (step 236). As such, there will be reserved bandwidth established between the mobile terminal 12 and the base station 24 (step 238), between the base station 24 and the serving service node 26 (step 240), and between the serving service node 26 and the gateway service node 28 over the visited network 20 (step 242) for the virtual connection. As such, a virtual connection with a defined quality of service is established between the mobile terminal 12 and the gateway service node 28 (step 244). IP connectivity between the gateway service node 28 and the application server 14 is provided in traditional fashion (step 246), and may not be associated with a certain amount of reserved bandwidth, since the core packet network 16 supporting such IP connectivity will generally be engineered to have sufficient capacity. In other embodiments, another tunnel may be established between the gateway service node 28 and the application service node 14, with or without defined QoS parameters.

Figure 4A:
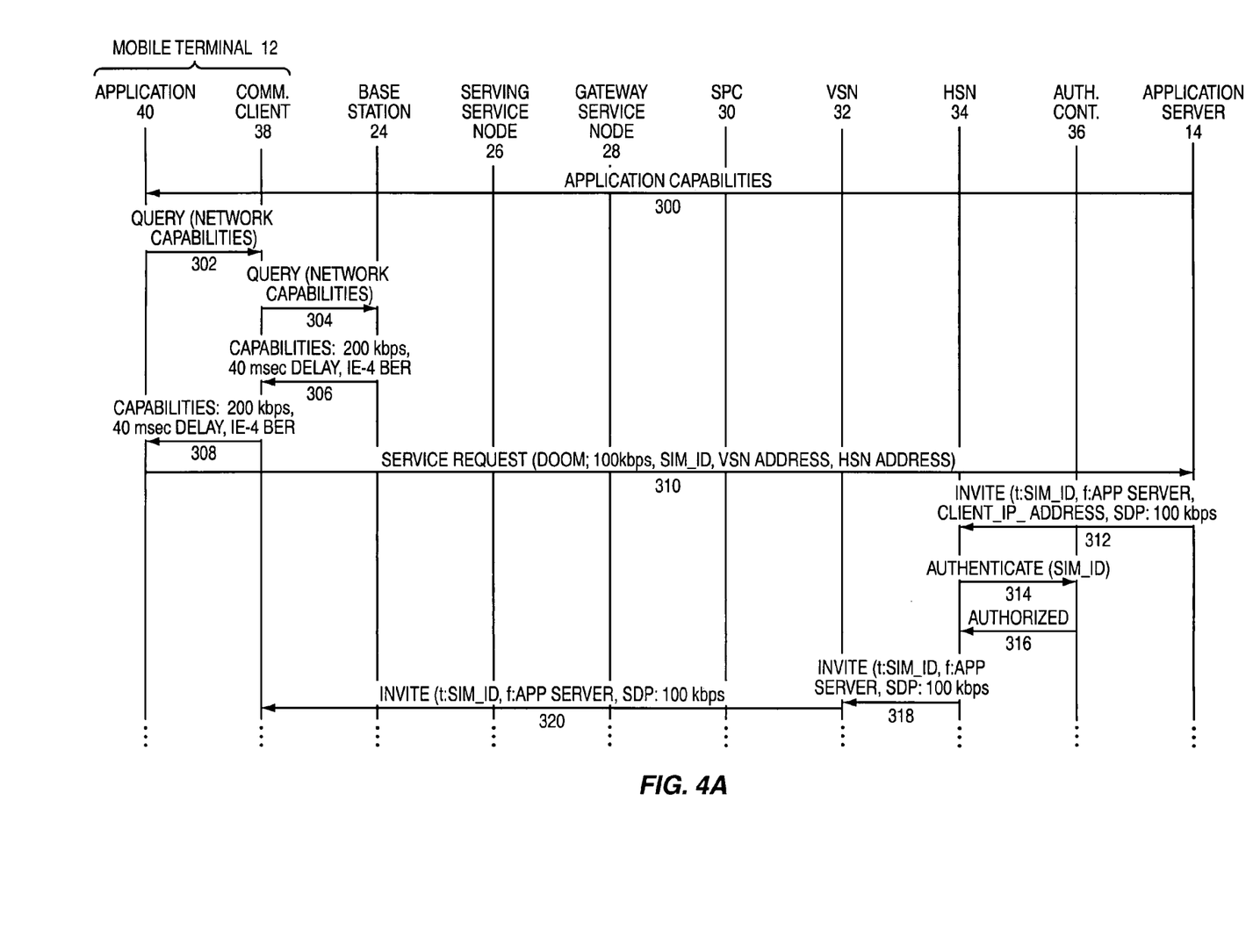
FIGS. 4A and 4B show a communication flow diagram illustrating operation of the present invention according to a second embodiment.
Figure 4B:
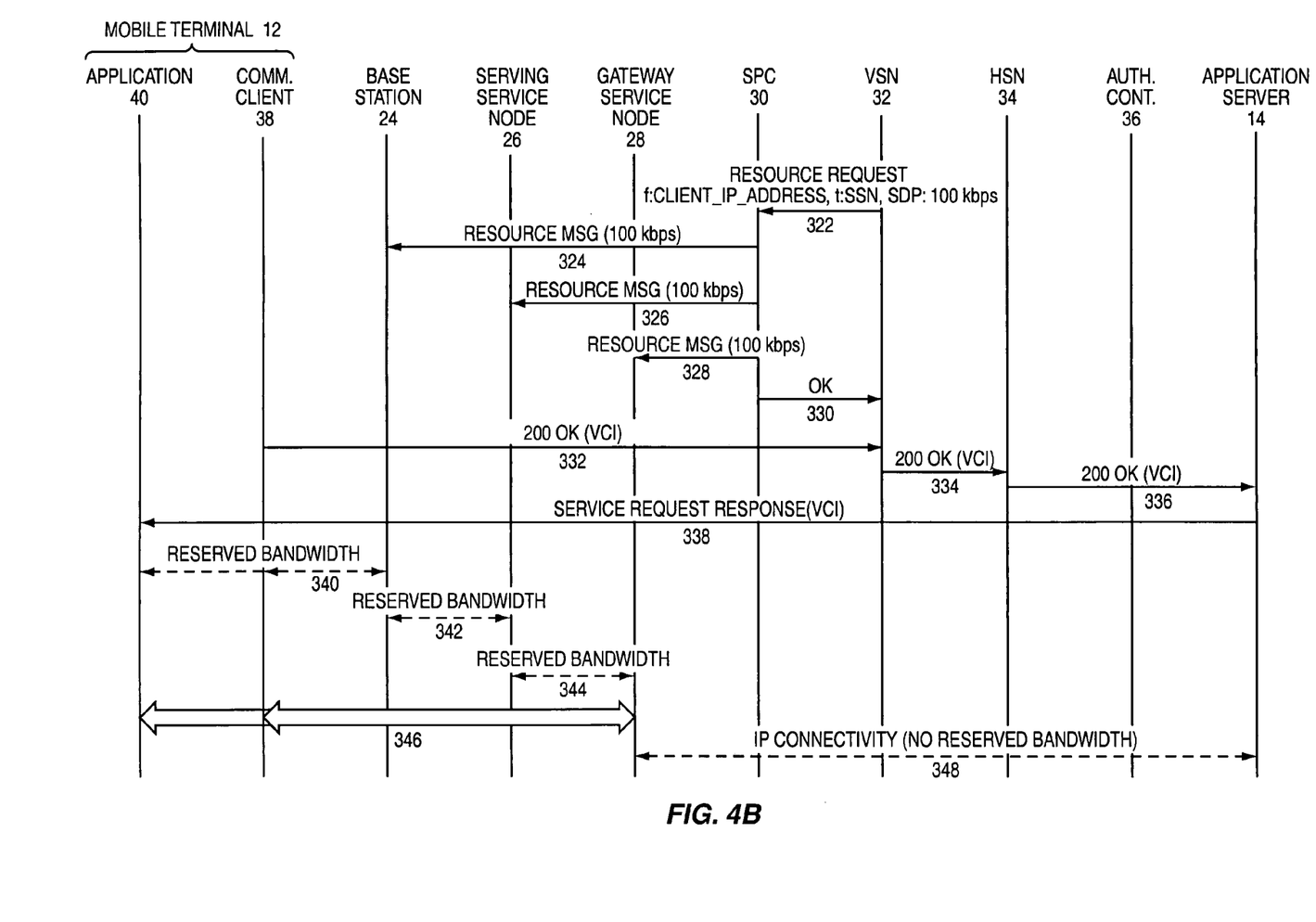

With reference to FIGS. 4A and 4B, a communication flow is illustrated for another embodiment wherein the application server 14 initiates a session with the mobile terminal 12, and in particular with an application 40 that is not a SIP-based application. Initially, the application server 14 will send a message including the application server's capabilities to the application 40 of the mobile terminal 12 (step 300). The application 40 will send a query to the communication client 38 to obtain the visited access network's capabilities (step 302). The communication client 38 will then send a query to the base station 24 to obtain the network capabilities (step 304). In response, the base station 24 will provide its capabilities for a communication session to the communication client 38 (step 306), which will forward these capabilities to the application 40 (step 308). If the visited access network's capabilities are sufficient with respect to the application server's capabilities, the application 40 may send a Service Request to the application server 14 to request a particular service having particular QoS parameters (step 310). In this instance, assume the Service Request is for establishing a session for a multiplayer Doom gaming session, which requires 100 kbps bandwidth. The Service Request will include the identification for the mobile terminal 12 (SIM ID) as well as the addresses for the VSN 32 and the HSN 34, which represent either end of the visited access network 20.

The application server 14 will then initiate an Invite message intended for the mobile terminal 12 (SIM ID). The Invite message may include the communication client's IP address, as well as session description protocol parameters providing the required bandwidth of 100 kbps for the requested Doom session. Since the HSN 34 is acting as a proxy, the Invite message will be received by the HSN 34 (step 312), which will take the necessary steps to authenticate the requested session by interacting with the authentication controller 36 (steps 314 and 316). The HSN 34 will then forward the Invite message to the VSN 32 associated with the visited access network 20 (step 318). The VSN 32 will in turn forward the Invite message to the communication client 38 (step 320), as well as send a Resource Request to the SPC 30 (step 322). The Resource Request will cause the SPC 30 to send Resource messages to reserve sufficient bandwidth to support a 100 kbps data rate through the base station 24, serving service node 26, and gateway service node 28. As such, Resource messages are sent to each of these entities (steps 324, 326, and 328). The SPC 30 will then send an OK message in response to the Resource Request after sending out the Resource messages to the routing entities associated with the visited access network 20 (step 330).

Meanwhile, the communication client 38 will send a 200 OK message in response to the Invite message of step 320 to the VSN 32 (step 332). The 200 OK message may include virtual circuit information (VCI) to facilitate communications over the virtual circuit once it is established between the mobile terminal 12 and the gateway service node 28. The VSN 32 will then send a 200 OK message including the virtual circuit information to the HSN 34 (step 334), which will forward the 200 OK message with the virtual circuit information to the application server 14 (step 336). At this point, the application server 14 is ready to respond to the application's Service Request of step 310. As such, the application server 14 will send a Service Request Response including the virtual circuit information to the application 40, which is running on the mobile terminal 12 (step 338). At this point, reserved bandwidth is established between the application 40 of the mobile terminal 12 and the base station 24 (step 340), between the base station 24 and the serving service node 26 (step 342), and between the serving service node 26 and the gateway service node 28 (step 344) to support the virtual circuit (step 346). The virtual circuit information provided in the Service Request Response is used by the application 40 to use the virtual circuit (step 346) to support the requested multimedia session. IP connectivity between the gateway service node 28 and the application server 14 may be established without reserved bandwidth (step 348). Those skilled in the art will recognize that reserved paths may be established in alternative fashions.

Figure 5:
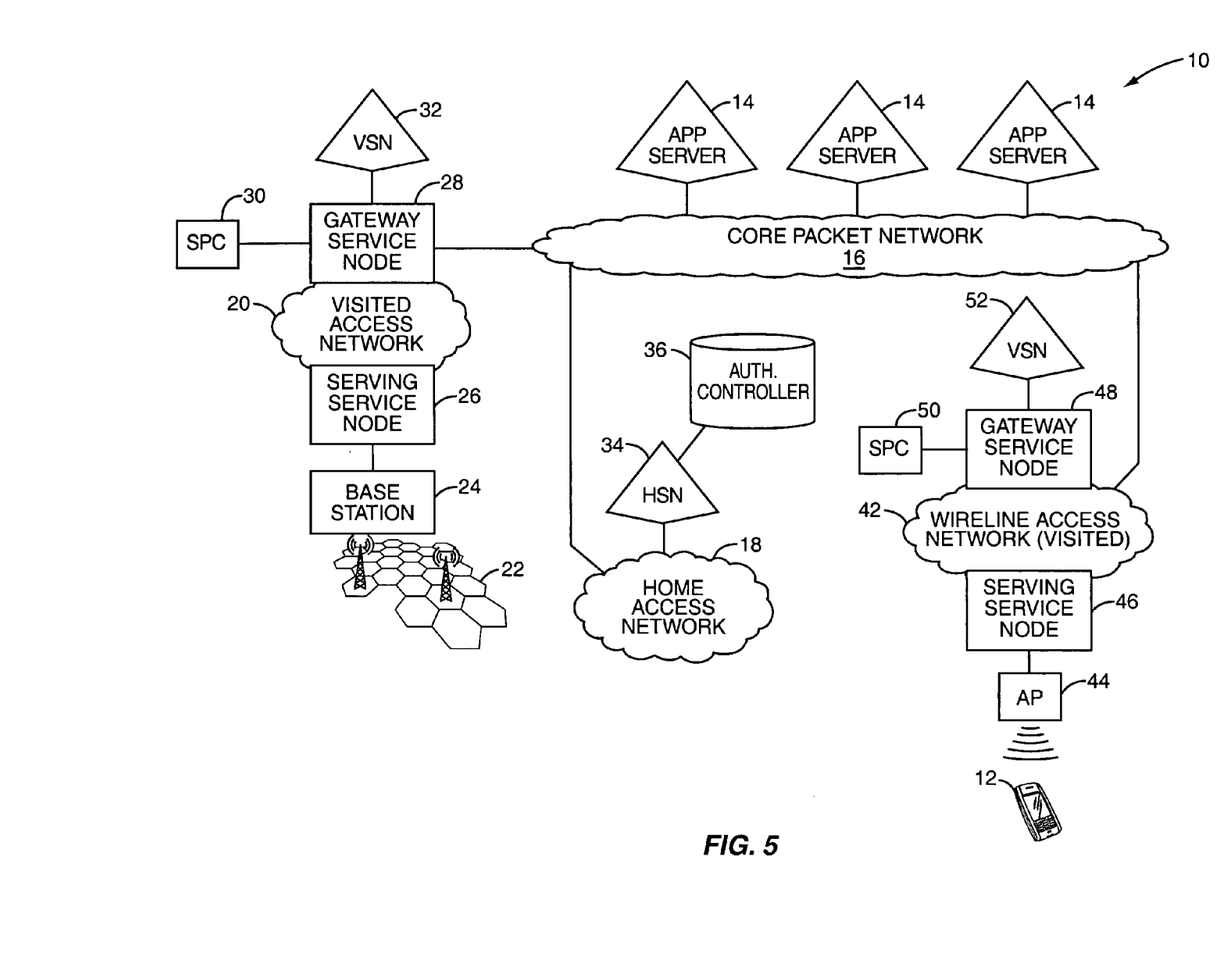
FIG. 5 is a block representation of a communication environment according to a second embodiment of the present invention.

Turning now to FIG. 5, the mobile communication environment 10 may take many forms, and may support various types of access networks. As illustrated, a wireline access network 42 may be used to support local wireless communications over a local wireless network. For example, a local wireless base station or access point (AP) 44 may be used to support local wireless communications with the mobile terminal 12. These local wireless communications may be those used in wireless local area networks, implementing 802.11 or Bluetooth communication technologies. The local wireless base station or access point 44 is coupled to a serving service node 46, which provides a point of entry to the wireline access network 42. On the opposite side of the wireline access network 42, a gateway service node 48 may be provided to facilitate direct or indirect communications with the core packet network 16. An SPC 50 and a VSN 52 may be provided, and will operate in a fashion similar to the corresponding elements described above. Those skilled in the art will recognize the various alternative configurations for access networks and facilitating virtual circuits over these access networks using the techniques described above.

Figure 6:
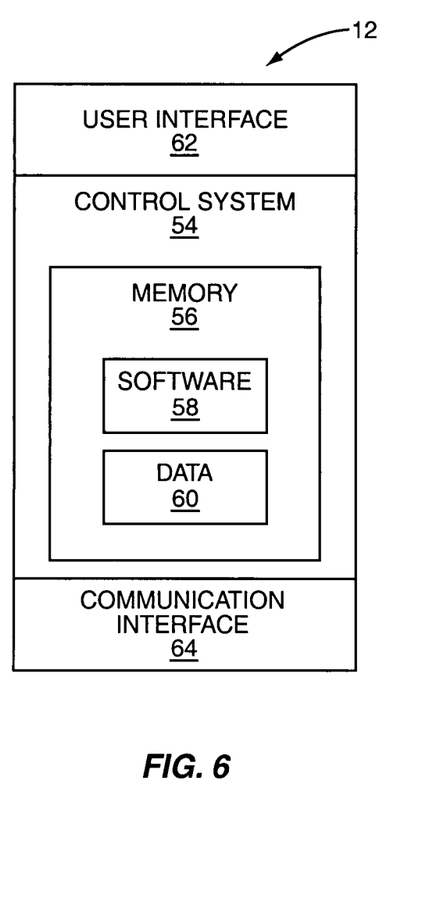
FIG. 6 is a block representation of a mobile terminal according to one embodiment of the present invention.

With reference to FIG. 6, a block representation of a mobile terminal 12 is illustrated as an exemplary endpoint. The mobile terminal 12 will generally include a control system 54 having memory 56 with the requisite software 58 and data 60 to operate as described above. The control system 54 will be associated with a user interface 62 to facilitate input and output functions associated with a user, as well as a communication interface 64 to facilitate communications with the visited access network 20 and home access network 18 via appropriate access points. The communication interface 64 will generally be a wireless communication interface supporting cellular or local wireless communication techniques such as those used in wireless local area networks. However, the communication interface 64 may support a physical wired connection with the access points.

Figure 7:
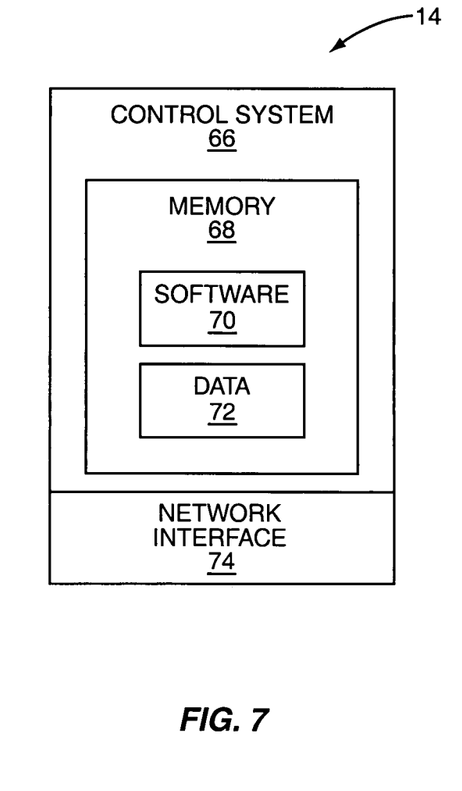
FIG. 7 is a block representation of an application server according to one embodiment of the present invention.

FIG. 7 is a block representation of an application server 14 as another exemplary endpoint according to one embodiment of the present invention. The application server 14 may include a control system 66 associated with memory 68 with the requisite software 70 and data 72 to operate as described above. The control system 66 will also be associated with a network interface 74 to facilitate communications via the core network 16 in a direct or indirect fashion.

Figure 8:
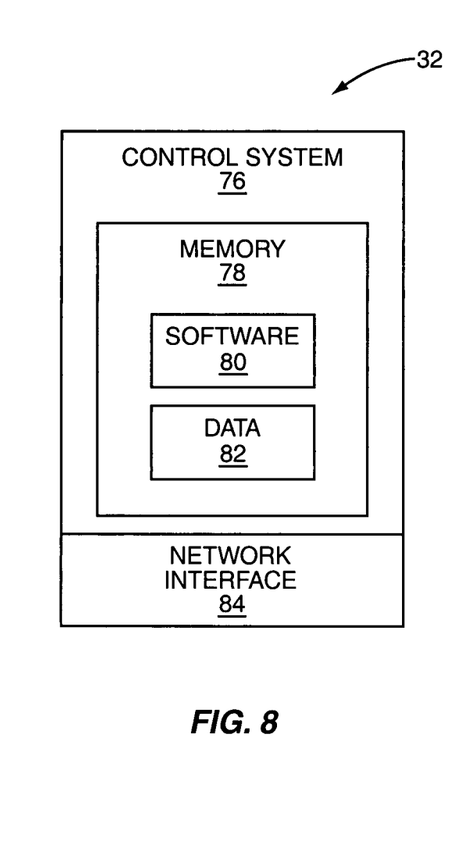
FIG. 8 is a block representation of a visited service node according to one embodiment of the present invention.

FIG. 8 is a block representation of a visited service node 32 according to one embodiment of the present invention. The visited service node 32 may include a control system 76 associated with memory 78 with the requisite software 80 and data 82 to operate as described above. The control system 76 will also be associated with a network interface 84 to facilitate communications.

Figure 9:
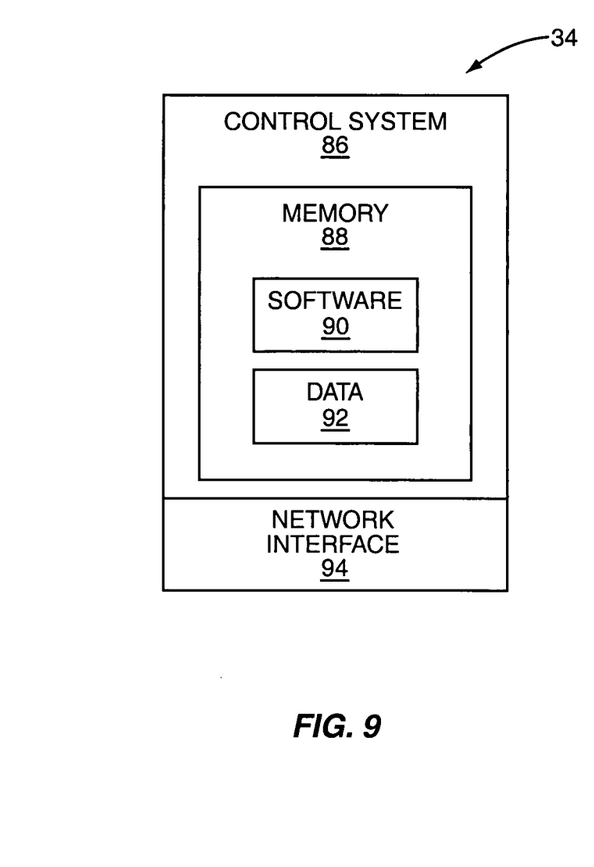
FIG. 9 is a block representation of a home service node according to one embodiment of the present invention.

FIG. 9 is a block representation of a home service node 34 according to one embodiment of the present invention. The home service node 34 may include a control system 86 associated with memory 88 with the requisite software 90 and data 92 to operate as described above. The control system 86 will also be associated with a network interface 94 to facilitate communications.

Those skilled in the art will recognize improvements and modifications to the preferred embodiments of the present invention. All such improvements and modifications are considered within the scope of the concepts disclosed herein and the claims that follow.

What is claimed is:

1. A method for facilitating authorized communications with a defined quality of service through a communications network for a mobile terminal comprising a communication client and a communication application where the communication application is not necessarily configured to use a communications establishing protocol of the communications network, the method comprising:
 receiving one or more indications of communication capabilities from an endpoint;
 based on the received indications, causing the communication client to establish a virtual circuit having a defined quality of service through the network using a first session establishment protocol of the communications network; and
 establishing at least one additional communication session extending from the communication application and through the established virtual circuit to the endpoint using a communication protocol within communication capabilities of the communication application.

2. The method of claim 1, wherein said causing the communication client to establish includes the communication application requesting the communication client to initiate establishing at least part of an authorized virtual circuit.

3. The method of claim 1, further comprising obtaining network capabilities bearing on resources of the network that are available to support communications.

4. The method of claim 3, wherein the communication application requests the communication client to obtain the network capabilities.

5. The method of claim 1, wherein the received one or more indications of communication capabilities from the endpoint include capabilities of an application at the endpoint.

6. The method of claim 1, wherein the network is an access network.

7. The method of claim 2, wherein the authorized virtual circuit is established to a gateway service node of the network.

8. The method of claim 1, wherein virtual circuit information sufficient to allow the at least one additional communication session to be established through the virtual circuit is provided directly or indirectly by the communication client to the communication application.

9. The method of claim 1, wherein the at least one additional communication session comprises a plurality of different types of communication sessions.

10. The method of claim 1, wherein the first session establishment protocol is a session initiation protocol and the network forms an integral part of an Internet Protocol Multimedia Subsystem (IMS).

11. The method of claim 1, wherein the at least one additional communication session uses a communication protocol other than a Session Initiation Protocol (SIP).

12. The method of claim 1, wherein said receiving the capabilities is in response to a query sent from the communication application to the endpoint.

13. A system for facilitating authorized communications with a defined quality of service comprising:
 a communication interface; and
 a control system, associated with the communication interface, the control system comprising:
  a communication application configured to:
   receive capabilities from an endpoint;
   based on the received capabilities, negotiate with a communication client to establish a virtual circuit; and
   establish at least one communication session through the established virtual circuit to the endpoint using a communication protocol; and
  a communication client configured to establish the virtual circuit having a defined quality of service through a network using a first session establishment protocol on behalf of the communication application.

14. The system of claim 13, wherein the communication client is further configured to:
 obtain network capabilities bearing on resources of the network that are available to support communications.

15. The system of claim 14, wherein the communication application requests the communication client to obtain the network capabilities.

16. The system of claim 13, wherein the communication application is further configured to:
 send a query to the endpoint to request the capabilities.

17. A system of claim 13, wherein the communication protocol is other than a Session Initiation Protocol (SIP).

18. The system of claim 13, wherein the at least one communication session comprises a plurality of different types of communication sessions.

19. A system of claim 13, wherein the first session establishment protocol is a Session Initiation Protocol (SIP) and the network forms an integral part of an Internet Protocol Multimedia Subsystem (IMS).

20. A mobile terminal comprising:
 one or more processors operatively coupled to a hardware memory and to a communications network and configured such that at least one of the processors executes executable instructions stored in the memory;

wherein the executable instructions are configured to cause the at least one of the processors to perform operations comprising:
  querying capabilities of a communication application residing in an application server disposed within the network;
  receiving the application capabilities from the application server;
  based on said received application capabilities, establishing a virtual circuit having a defined quality of service and extending through the network, the establishing of the virtual circuit using a first session establishment protocol; and
  establishing at least one additional communication session extending through the virtual circuit to the communication application residing in the application server using a communication protocol that is within said received application capabilities.

\* \* \* \* \*